United States Patent [19]

McKenna

[11] 3,732,484

[45] May 8, 1973

[54] DELAYED ACTION LOAD SWITCH

[75] Inventor: Joseph V. McKenna, Franklin Lakes, N.J.

[73] Assignee: McWilker Enterprises, Little Falls, N.J.

[22] Filed: Oct. 20, 1971

[21] Appl. No.: 190,966

[52] U.S. Cl. .........................323/19, 323/24, 323/36, 315/100 D

[51] Int. Cl. .................................................G05f 3/04

[58] Field of Search .........................307/141; 323/24, 323/36, 39, 19; 315/100 D

[56] References Cited

UNITED STATES PATENTS 3,596,171 7/1971 Hildebrand............................323/24

OTHER PUBLICATIONS

Bik, "Build the Dynadim," Popular Electronics, Sept. 1968, pp. 71–73.

*Primary Examiner*—Robert K. Schaefer
*Assistant Examiner*—William J. Smith
*Attorney*—S. A. Giarratana

[57] ABSTRACT

A delayed-action load switch for A-C operation including a trigger-controlled bilateral solid-state power switch, e.g., a triac, connected in series with a load, and in parallel with a manually-operable on-off switch across an A-C source. A charge-storage capacitor discharges through a bilateral breakover device (e.g., an avalanche switch) to trigger the triac to conduction when the charge on the capacitor reaches a threshold value. The capacitor is charged on each cycle from the A-C source through a bias accumulation network which builds up a D-C potential, increasing with each cycle in opposing the charging of the capacitor so that the threshold value is attained progressively later in each cycle and the proportion of the cycle during which the triac is conductive is gradually reduced to zero.

4 Claims, 15 Drawing Figures

INVENTOR.
JOSEPH V. McKENNA

INVENTOR.
JOSEPH V. McKENNA

DELAYED ACTION LOAD SWITCH

This invention relates to load switches, and particularly to solid-state, delayed-action on-off switches which disconnect a load device from an A-C source following a pre-set time lapse after the on-off switch is placed in "off" condition.

For safety and convenience it is often desirable to delay the effect of a load switch as, for example, where the switch controls the lighting in a basement or garage and the lights are to remain "on" for a short period after the switch is turned "off", affording the operator time to leave the area before it is darkened.

A wide variety of prior art arrangements and devices have been proposed, electronic, mechanical (e.g., pneumatic and hydraulic) and magnetic. However, they are for the most part characterized by complexity of design, with attendant relatively high cost and propensity for malfunction.

It is, therefore, a primary object of the present invention to provide a delayed-action switch which is simple in design, reliable in application, and low in cost.

A more specific object is the provision of a completely electronic, solid-state delayed-action switch which, used in conjunction with a conventional double-pole, single-throw control switch, delays complete removal of power from an A-C load for a pre-set time after the DPST switch is opened.

Another object is the provision of a delayed-action switch in which removal of the load from the A-C power source is gradual rather than instantaneous.

To the attainment of the foregoing and other objects and advantages, the invention contemplates a delayed-action switch including a bilaterally-operative, trigger-controlled electronic switching device connected in parallel with an on-off switch controlling the application of power from an A-C source to a load which is in series with the on-off switch. Means are provided for intermittently applying a trigger signal to render the switching device conductive at a pre-selected phase angle and for monotonically varying the phase angle from a value at which the device is substantially continuously conductive to a second value at which it is continuously non-conductive.

The invention will be more fully understood from the description of a preferred embodiment illustrated in the drawings in which:

FIGS. 4*a*–7*c* are waveforms at various points of the circuit shown in FIG. 3 at intervals following opening of the control switch.

Figure 1:
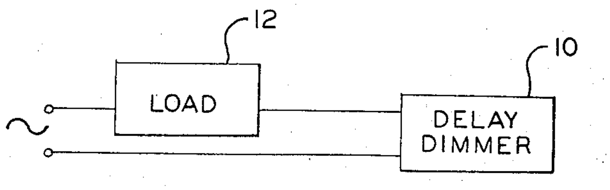
FIG. 1 is a block diagram showing the manner in which the delay dimmer load switch of this invention is connected in relation to a load and an A-C power source.

In FIG. 1, the delay dimmer is represented by block 10 and may include within the unit an integral double-pole, single-throw control switch, not shown in this Figure. The DPST switch may, of course, be a separate entity. A load device 12, which may be an incandescent lamp, is connected to an A-C power source through switch 10 in a manner which will be seen presently.

Figure 2:
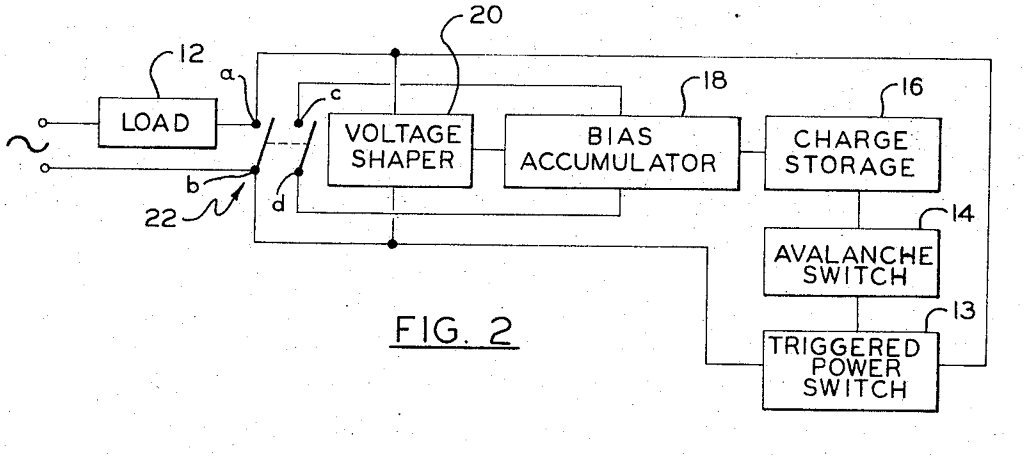
FIG. 2 is a block diagram of a preferred implementation of the delay dimmer load switch.

FIG. 2 is a functional block diagram of delay dimmer 10 and includes a separate DPST switch 22. On section or pole of switch 22, consisting of a fixed contact **22*a*, and a movable contact 22*b*, is connected in series with load 12 across an A-C power line and functions as an on-off switch. The other half of switch 22, consisting of fixed contact 22*c* and movable contact 22d, is connected across a bias accumulator, block 18, in a manner and for a purpose which will become apparent as this description proceeds. A triggered power switch 13 is connected in series with load 12, and in parallel with on-off switch 22*a*,*b* and voltage shaper 20**, across the A-C line.

The output of voltage shaper 20 is passed through bias accumulator 18 to a charge storage device 16, the potential of which closely follows the A-C line voltage. Storage device 16 is connected through avalanche switch 14 to the trigger or gate of power switch 13.

When switch 22 is closed, load 12 is connected directly to the A-C line and the circuitry of delay dimmer 10 is inoperative. When switch 22 is opened, a charge of one polarity builds up in storage device 16 during the first half cycle until a threshold value is reached whereupon avalanche switch 14 breaks down and a high current surge is applied to trigger switch 13 to conduction, thus completing a circuit around open switch contacts **22*a*,*b***. The function is repeated with opposite polarity during the next half-cycle.

On each cycle, a small D-C potential is accumulated in bias accumulation 18 acting to oppose the charge supplied to storage device 16. As the D-C potential increases monotonically with each cycle, the phase angle at which switch 13 is triggered is increased so that switch 13 is conductive for a progressively shorter portion of each half cycle. This results in a gradual diminution of the power supplied to the load which, with proper selection of circuit constants, reaches zero at a predetermined time interval following opening of switch 22.

One practical embodiment of the invention will now be described with reference to FIG. 3, the correlation of which with the block diagram of FIG. 2 will be obvious from the commonality of the reference numerals employed.

Figure 3:
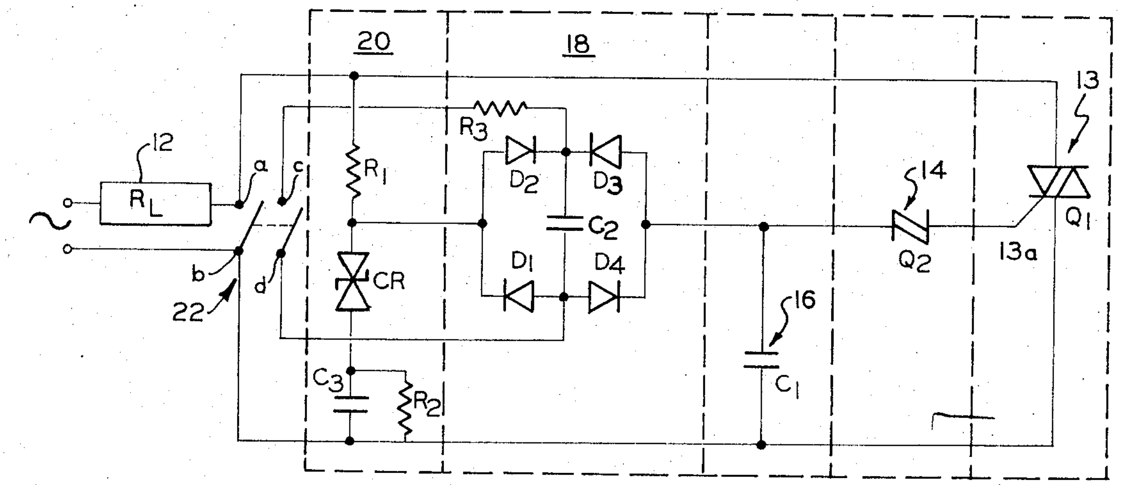
FIG. 3 is a schematic diagram of a practical embodiment of the load switch contemplated by the invention.

In FIG. 3, the triggered power switch is shown to be a solid-state device $Q_1$ of the type generically known as a "triac". A triac is essentially similar to an SCR with the exception that it is capable of conducting current in both directions when a suitable signal pulse is applied to its control electrode or gate **13*a*** while a given voltage difference exists between its terminal electrodes. For additional description of devices of this type reference may be had to U.S. Pat. Nos. 3,346,874 and 3,443,188.

Charge storage device 16 is a capacitor $C_1$ having one terminal connected to the A-C line through contact b of switch 22 and the other terminal to the gate **13*a* of triac $Q_1$ through avalanche switch $Q_2$. When the charge on capacitor $C_1$, of either polarity, exceeds the threshold voltage of $Q_2$, $Q_2$ breaks down and delivers a current surge to gate 13*a*** of $Q_1$, rendering it conductive.

Capacitor $C_1$ is charged through bias accumulator 18 comprising diodes $D_1$, $D_2$, $D_3$ and $D_4$ in a bridge rectifier configuration. A capacitor $C_2$ is connected across one diagonal of the bridge, viz., the DC output. The same bridge terminals are connected, respectively, through resistor $R_3$ to switch contact 22c and directly to switch contact 22*d*. Thus it will be seen that closing switch 22 discharges $C_2$ through $R_3$.

One of the remaining terminals of the bridge network is connected to storage capacitor $C_1$ and the other to the A-C line through resistor $R_1$ of voltage shaper 20, and lamp load $R_L$. In addition to $R_1$ voltage shaper 20 includes, in series connection therewith, a pair of diodes CR connected cathode-to-cathode and a capacitor $C_3$, by-passed by shunt resistor $R_2$.

In a practical device, capable of controlling loads from 10 to 600 watts, the circuit constants and components may be as follows:

| | |
|---|---|
| $R_1$ | 75 kilohms |
| $R_2$ | 2 megohms |
| $R_3$ | 1 kilohm |
| $C_1$ | 0.02 microfarad |
| $C_2$ | 22 microfarads |
| $C_3$ | 0.47 microfarad |
| CR | Two IN972, cathode-to-cathode in series |
| $R_1$ to $R_4$ | IN645 |
| $Q_1$ | RCA 40668 |
| $Q_2$ | 2N4991 |

The circuit of FIG. 3 operates in the following manner. With switch 22 closed, i.e., in the "on" position, a direct circuit exists through its contacts *a* and *b* connecting load $R_L$ across the AC power line. Concomitantly, closure of switch contacts 14*c* and d drains any charge extant on $C_2$, as previously mentioned. Any charge extant in voltage shaper 20 is quickly dissipated as no input voltage appears across it and the remainder of the circuit is similarly inactive.

When switch 22 is opened, i.e., turned "off", power to the load is momentarily interrupted and substantially full line voltage appears across terminals 22*a*,*b* which are, in effect, the input terminals to the delay dimmer 10. At the same time, the discharge path for capacitor $C_2$ is interrupted.

Voltage shaper 20 initially delivers practically the full line voltage through resistor $R_1$ to bias accumulator 18. As capacitor $C_2$ is fully discharged, current passes directly to storage capacitor $C_1$. Because, as will be noted from the circuit values given above, the value of the time constant $R_1C_1$ is small, viz., 1.5 milliseconds, the voltage on $C_1$ closely follows the A-C line.

When the voltage on $C_1$ exceeds a threshold value corresponding to the breakdown voltage of avalanche switch $Q_2$, which has an impedance of tens of kilohms before breakdown and in the order of 10 ohms after. At breakdown then, a high current discharge from $C_1$ is delivered to the gate 13*a* of triac $Q_1$ which becomes conductive, its impedance dropping from tens of kilohms to perhaps one ohm. Once triggered the triac remains conductive as long as a holding current of some tens of milliamps is maintained.

Figures 4A, 4B, 4C, 5A, 5B, 5C, 6A, 6B, 6C, 7A, 7B, 7C:
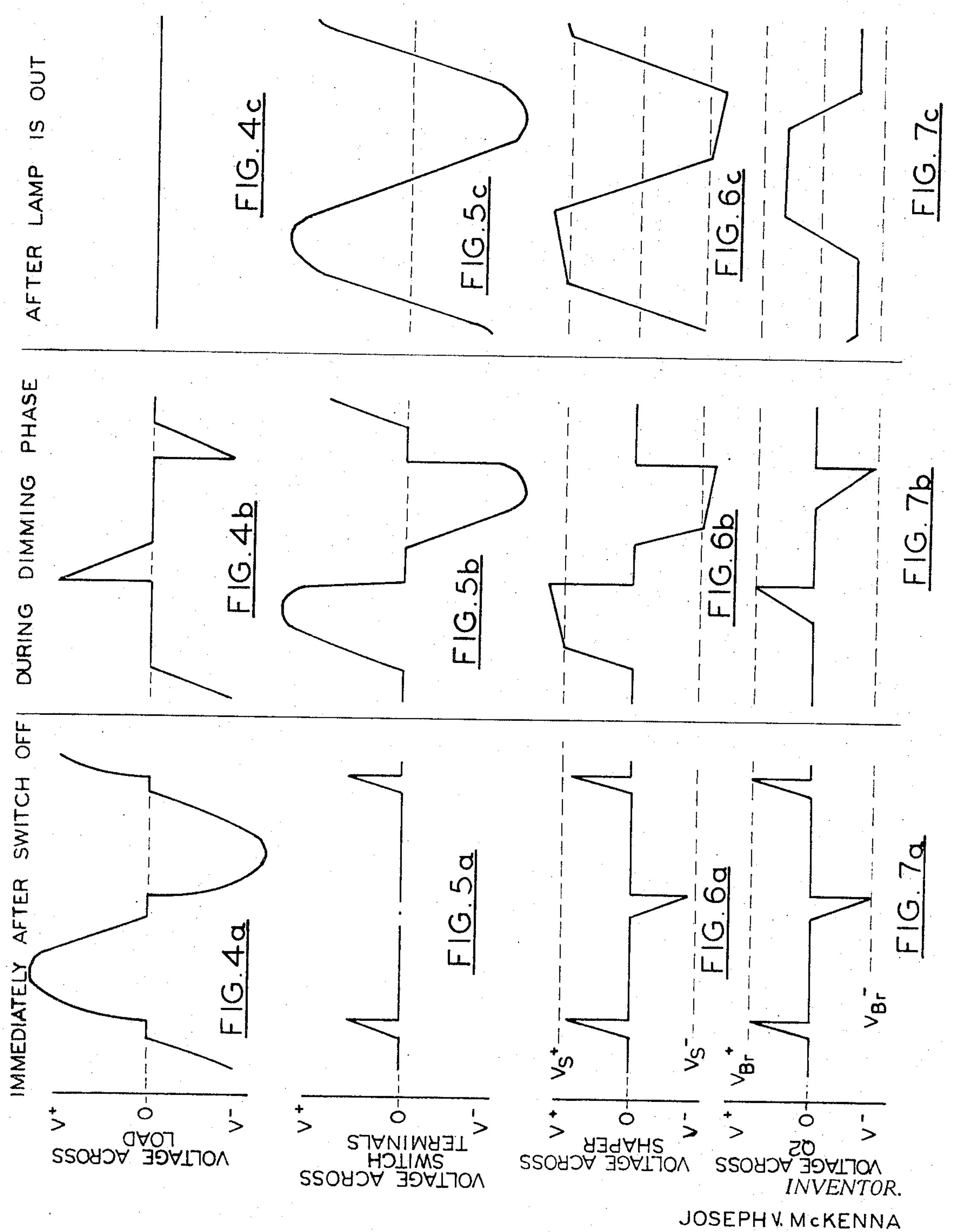

With the triac $Q_1$ in its low impedance condition, the voltage drop through delay dimmer 10 falls to the order of one volt and remains at this low level until the load current is less than the holding current of $Q_1$. This effect is evident from the waveforms of FIGS. 4–7. Thus, while conductive, triac $Q_1$ forms a low impedance path around the open terminals of switch 22 in series with the much higher impedance $R_L$ of load 12 across the A-C line. The load consequently experiences practically full line voltage immediately after switch 22 is opened, as shown in FIG. 4*a*.

Toward the end of the first half-cycle, just before the zero crossing of the line voltage, the load current drops below the holding current of the triac which reverts to its high impedance state. On the second half of the cycle, the operation of the circuit is repeated with opposite polarity voltage applied to the terminals 22*a*,*b*.

As the charge storage capacitor closely follows the line voltage and as the breakdown voltage of the avalanche switch is small (typically 8 volts) in relation to peak line voltage, the triac turns conductive early in each half-cycle and remains conductive for substantially the remainder of the particular half-cycle. This operation obtains for several hundred cycles after the control switch 22 is turned off, with the result that the lamp load continues to receive substantially full power, i.e., there is no perceptible dimming of the lamp immediately following its switch-off.

On each breakdown of avalanche switch $Q_2$, essentially the entire charge on storage capacitor $C_1$ is dissipated in the avalanche switch and the gate junction 13*a* of the triac. Each successive recharge of the storage capacitor is passed through bias accumulator 18 including capacitor $C_2$ which, it will be noted from the exemplary circuit constants given above, has four orders of magnitude higher capacitance than capacitor $C_1$. Moreover, the charge to $C_2$ is the rectified output of the bridge network. Consequently, even though the potential stored on $C_2$ during each cycle is minute, it builds cumulatively with time and is in opposition to the voltage supplied by the voltage shaper to charge storage capacitor $C_1$. As a result, higher voltages are required of the voltage shaper before charging capacitor $C_1$ on each successive cycle and the triggering of the triac is delayed accordingly.

In the assumed example where the storage capacitor is 0.02 microfarad, the bias accumulator capacitor is 20 microfarads, and the breakdown voltage of the avalanche switch is $\pm$ 8 volts, the phase angle at which the triac is triggered on each cycle of a 110 volt RMS power line is increased by about 0.006 degrees, theoretically. In actual practice the change in triac-triggering phase angle is much larger because of the finite impedance of avalanche switch $Q_2$ before breakdown.

In the assumed example, the lamp would maintain nominal full brilliance for a period of about 30 seconds, followed by perceptible dimming to extinction in 10 seconds.

Voltage shaper 20 functions to deliver line voltage directly to bias accumulator 18 for the entire interval after switch-off that nominal full lamp brilliance is desired. As will be seen from FIGS. 4–7, after this interval the voltage shaper begins to truncate available line voltage in such a manner that its output approaches a double ramp, i.e., a high rate-of-rise ramp voltage (essentially the line voltage following a voltage crossover) followed by a much lower rate-of-rise ramp commencing in the order of 30 degrees after power line voltage crossover.

Inasmuch as the bias accumulator increases, by a fixed increment per half-cycle, the magnitude of the voltage shaper output required to cause firing of the triac, the number of phase angle degrees delay in each succeeding cycle will become larger during the low rate-of-rise ramp than during the period when the voltage shaper is not truncating the input to the bias accumulator. This causes the very gradual and initially imperceptible dimming of the lamp load during the period immediately following switch-off followed by a perceptibly accelerated dimming, coinciding with truncated input to the bias accumulator, until the lamp is fully extinguished. The waveforms of FIGS. 4*c*, 5*c*, 6*c*, and 7*c* are those exhibited after complete removal of power to the load. This condition persists until switch 22 is again placed in the "on" position. Obviously the total period and the proportionate segments can be varied over large ranges by selection of circuit constants and components. Triacs currently available permit circuits with power handling capacities of over 2000 watts.

What is claimed is:

1. An electronic load switch comprising, in combination, input terminals for connection in series to an A-C source; a triggered bilateral power switching means having a pair of terminal electrodes, connected respectively to said input terminals, and a control electrode; a bridge rectifier having one input terminal connected to one of said load switch input terminals; a storage capacitor having one terminal connected to the other input terminal of said bridge rectifier and its other terminal to the other load switch input terminal; an avalanche switch connected between said one terminal of the storage capacitor and the control terminal of said power switching means; and a bias accumulator capacitor of much higher capacitance than said storage capacitor, connected across the output terminals of said bridge rectifier.

2. An electronic load switch according to claim 1 including a pair of diodes connected cathode-to-cathode in series with a capacitor between said one input terminal of the bridge rectifier and said other input terminal of the load switch.

3. An electronic load switch according to claim 2 including a double pole single throw switch having one pair of switch terminals in common with the load switch input terminals and another pair of switch terminals connected respectively to the output terminals of said bridge rectifier.

4. An electronic load switch according to claim 3 including a resistance element connected between said one input terminal of the load switch and said one input terminal of the bridge rectifier, said resistance element and storage capacitor constituting a small RC time constant.

* * * * *